United States Patent
Dropps et al.

(10) Patent No.: US 10,592,465 B2
(45) Date of Patent: Mar. 17, 2020

(54) NODE CONTROLLER DIRECT SOCKET GROUP MEMORY ACCESS

(71) Applicant: Hewlett Packard Enterprise Development LP, Houston, TX (US)

(72) Inventors: Frank R. Dropps, Eagan, MN (US); Eric C. Fromm, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 174 days.

(21) Appl. No.: 15/794,471

(22) Filed: Oct. 26, 2017

(65) Prior Publication Data

US 2019/0129884 A1    May 2, 2019

(51) Int. Cl.
  *G06F 12/08* (2016.01)
  *G06F 15/173* (2006.01)
  *G06F 12/0813* (2016.01)
  *G06F 12/0815* (2016.01)

(52) U.S. Cl.
  CPC .... *G06F 15/17343* (2013.01); *G06F 12/0813* (2013.01); *G06F 12/0815* (2013.01); *G06F 15/17381* (2013.01); *G06F 2212/2542* (2013.01); *G06F 2212/507* (2013.01)

(58) Field of Classification Search
  CPC ... G06F 12/08; G06F 12/0813; G06F 12/0815
  USPC ........................................................ 711/141
  See application file for complete search history.

(56) References Cited

U.S. PATENT DOCUMENTS

| | | | |
|---|---|---|---|
| 6,085,293 A | 7/2000 | Carpenter et al. | |
| 6,865,595 B2 | 3/2005 | Glasco | |
| 6,938,128 B1 | 8/2005 | Kuskin et al. | |
| 7,881,321 B2 | 2/2011 | Deneroff et al. | |
| 8,656,115 B2 | 2/2014 | Kottapalli et al. | |
| 2006/0265554 A1* | 11/2006 | Carter | G06F 12/0817 711/144 |
| 2008/0195820 A1* | 8/2008 | Lais | G06F 12/082 711/146 |
| 2015/0058570 A1* | 2/2015 | Wang | G06F 12/0804 711/122 |

OTHER PUBLICATIONS

Iyer, R. et al., "Switch Cache: a Framework for Improving the Remote Memory Access Latency of CC-numa Multiprocessors," (Research Paper), Jan. 9-13, 1999, 9 pages, http://ieeexplore.ieee.org/document/744357/.

Kim, G. et al., "Memory-centric System Interconnect Design with Hybrid Memory Cubes," (Research Paper), 2013, pp. 145-155. https://dl.acm.org/doi/pdf/10.5555/2523721.2523744?download=true.

(Continued)

*Primary Examiner* — Than Nguyen
(74) *Attorney, Agent, or Firm* — Hewlett Packard Enterprise Patent Department

(57) ABSTRACT

A node controller for a first processor socket group may include a node memory storing a coherence directory and logic. Logic may cause the node controller to: receive a memory operation request directly from a second processor socket group, follow a coherence protocol based on the memory operation request and the coherence directory and directly access a socket group memory of the first processor socket group based on the request.

11 Claims, 5 Drawing Sheets

(56) References Cited

OTHER PUBLICATIONS

Hybrid Memory Cube Consortium, "About Hybrid Memory Cube" available online at <http://hybridmemorycube.org/technology.html>, 2018, 2 pages.
Hybrid Memory Cube Consortium, "Hybrid Memory Cube Specification 2.1", 2014, 132 pages.
Intel Corporation, "An Introduction to the Intel QuickPath Interconnect", Document No. 320412-001US, Jan. 2009, 22 pages.

* cited by examiner

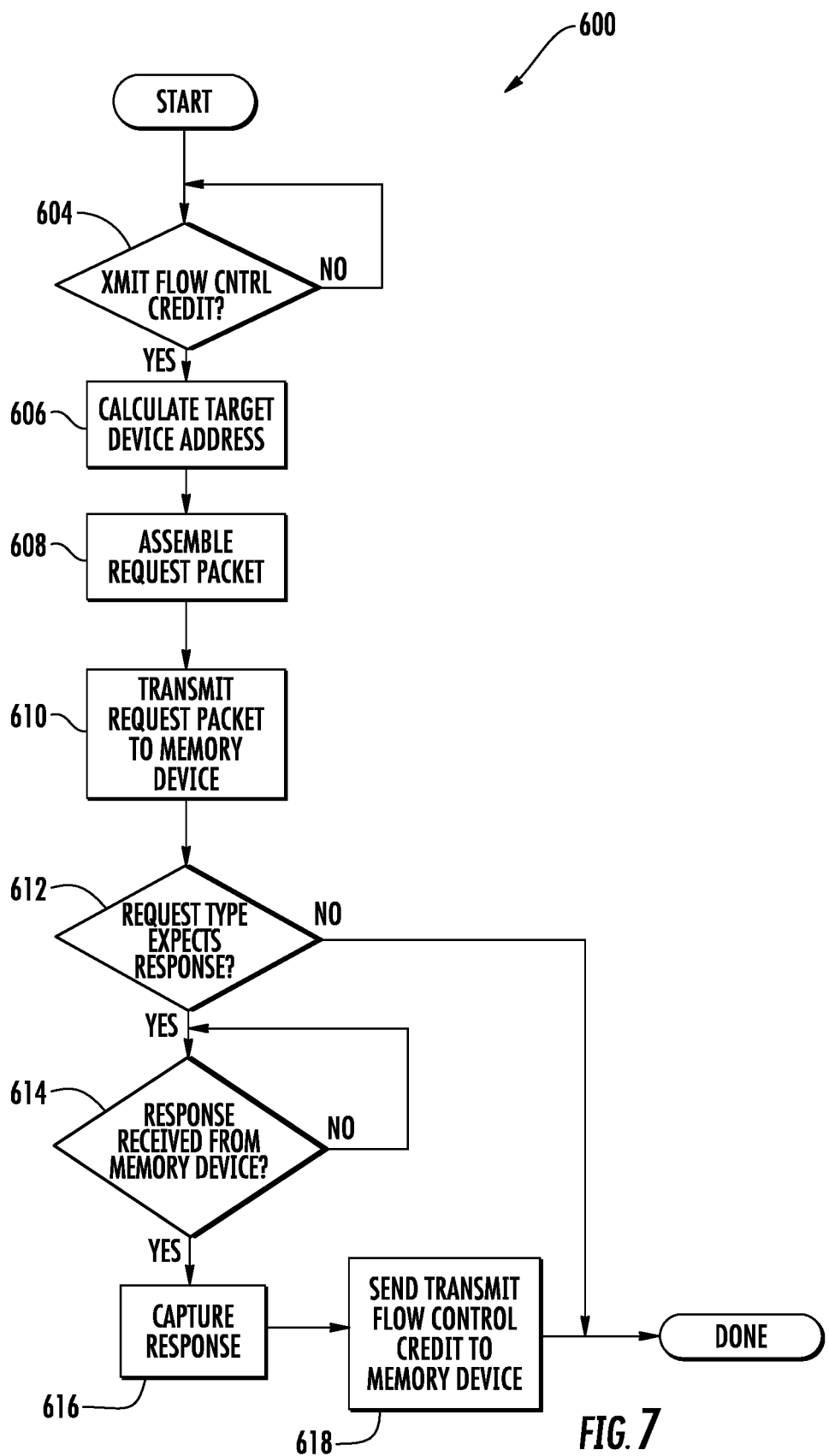

NODE CONTROLLER DIRECT SOCKET GROUP MEMORY ACCESS

BACKGROUND

A multi-processor system can include multiple processors that can be associated with respective local memories. The multi-processor system can be arranged as a cache-coherent non-uniform memory access (ccNUMA) system in which a processor can remotely access a memory associated with another processor.

BRIEF DESCRIPTION OF THE DRAWINGS

FIG. 7 is a flow diagram of an example method for a node controller to process a memory request, such as a memory request from a remote socket.

Figure 1:
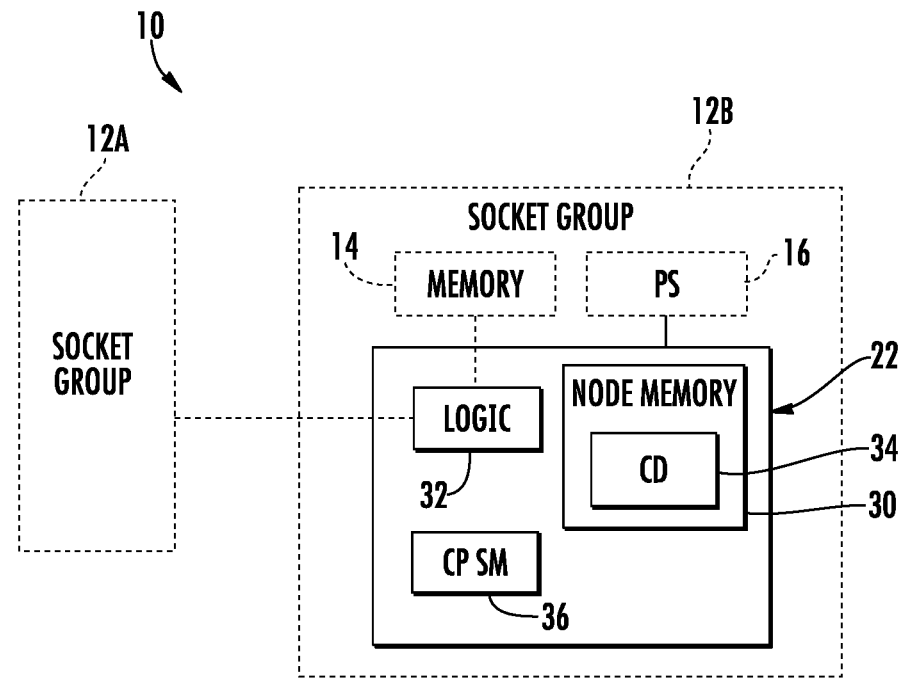
FIG. 1 is a schematic diagram illustrating portions of an example node controller as part of an example multiprocessor system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

When a processor in a ccNUMA system has to access a memory that is not connected locally, additional latency may impact the performance of the system. For example, the time it takes a processor to access a remote memory is greater than the time it takes for the processor to access its local memory. The number of traversals of the interconnect network between the processor and the remote memory needed to modify the contents of an address in a remote memory adds latency when compared to the time required for the processor to access the local memory to modify the contents of an address in the local memory.

A node controller is electronic device, such as an integrated circuit, that controls communications and messaging in a socket group and between different socket groups or processors of a multiprocessor system. A node controller is a memory interface processor interconnect. A socket group is a grouping of at least one processor having at least one processor socket and at least one node controller, wherein each of the processor sockets are directly interconnected to one another and wherein the at least one processor has at least one local memory.

Disclosed herein are example node controllers, multiprocessor systems and methods that provide low latency memory access times in a coherent shared memory system, such as a cache-coherent non-uniform memory access (ccNUMA) system. The disclosed example node controllers, multiprocessor systems and methods reduce remote memory latency by avoiding delays through a processor socket. In some implementations, the example node controllers, multiprocessor systems and methods utilize pin friendly higher performance serial interfaces.

Disclosed is an example node controller for a first processor socket group. The example node controller may comprise a node memory storing a coherence directory and logic. Logic may cause the node controller to: receive a memory operation request directly from a second processor socket group, follow a coherence protocol based on the memory operation request and the coherence directory and directly access a socket group memory of the first processor socket group based on the request.

Disclosed is an example system that may comprise a first processor socket group and a second processor socket group. The first processor socket group may comprise a first processor socket, a first socket group memory and a first node controller. The second processor socket group may comprise a second processor socket, a second socket group memory and a second node controller. The second node controller may comprise logic causing the second node controller to: receive a memory operation request directly from the first node controller, follow a coherence protocol based upon the received memory operation request and directly access the second socket group memory based upon the request.

Disclosed herein is an example method that may comprise receiving a memory operation request, with a node controller of a first socket group, directly from a second socket group, following a coherence protocol based upon the received memory operation request with the node controller and directly accessing a socket group memory of the first socket group based upon the request with the node controller.

Disclosed herein is an example method that may comprise directly receiving, with the node controller, a response from the second socket group, forwarding, with the node controller, the response to a processor socket of the first socket group and directly accessing, with the node controller, the socket group memory of the first socket group based upon the response.

FIG. 1 schematically illustrates portions of an example node controller 20 as part of an example ccNUMA system 10 (shown in broken lines). System 10 comprises socket groups 12A and 12B (collectively referred to as socket groups 12), wherein each of socket groups 12 comprises at least one processor having at least one processor socket 16, at least one memory 14 associated with the socket group, and a node controller 20.

FIG. 1 illustrates one example node controller 20. Node controller 20 reduces remote memory latency by avoiding delays through a processor socket. Node controller 20 facilitates direct node controller-to-node controller communication and direct node controller to socket group memory access, avoiding latency delays through a processor socket. Node controller 20 comprises an electronics component or integrated circuit 22 which comprises node memory 30, logic 32 and coherence protocol state machine 36.

Node memory 30 comprises a memory which stores a coherence directory 34. Coherence directory 34 comprises a database indicating coherence status for locations in the at least one socket group memory 14. Coherence directory 34 may comprise stored data entries indicating the ownership status a particular memory location or groups of memory locations also referred to as memory blocks. For example, in particular memory location or group of memory locations; such as a cache line size block of memory may be shared or may be exclusively owned.

The coherence protocol comprises a set of procedures, rules or protocols which are to be followed by the coherence protocol state machine 36 and by logic 32 when accessing the at least one memory 14. For example, a coherence protocol may dictate how node controller 20 is to interact with the at least one memory 14 as well as an associated processor socket or processor of the socket group depending upon the current coherence status for a particular memory block stored in the at least one memory 14. Coherence protocol may dictate what permissions are to be obtained when accessing a particular memory block in the at least one memory 14, such as when writing or reading to the at least one memory block stored in memory 14. As will be appreciated, different systems 10 may follow different coherence protocols.

Logic 32 comprises logic elements or components as part of circuit 22. Logic 32 and coherence protocol state machine 36 carry out the coherence protocol based on data in the coherence directory 34. In the example illustrated, logic 32 causes node controller 20 to receive a memory operation request directly from a second processor group. For example, logic 32 of node controller 20 directs node controller 20 of socket group 12B to directly receive a memory operation request from socket group 12A. The memory operation request may comprise a read operation and/or a write operation. In one implementation, the memory operation request is received directly from a node controller 20 of socket group 12A.

Logic 32 further causes node controller 22 follows a coherence protocol, as sequenced by the coherence protocol state machine 36, based upon the received memory operation request and data contained in the coherence directory 34. Following the coherence protocol, logic 32 causes node controller 20 to directly access socket group memory 14 of socket group 12B based upon the request from socket group 12A. Because node controller 20 directly receives the memory operation request from socket group 12A, without the memory operation request passing through a processor socket, memory access latency is reduced. Because node controller 20 directly accesses memory 14 to carry out the memory operation request, without passing through a processor socket, memory access latency is further reduced.

Figure 2:
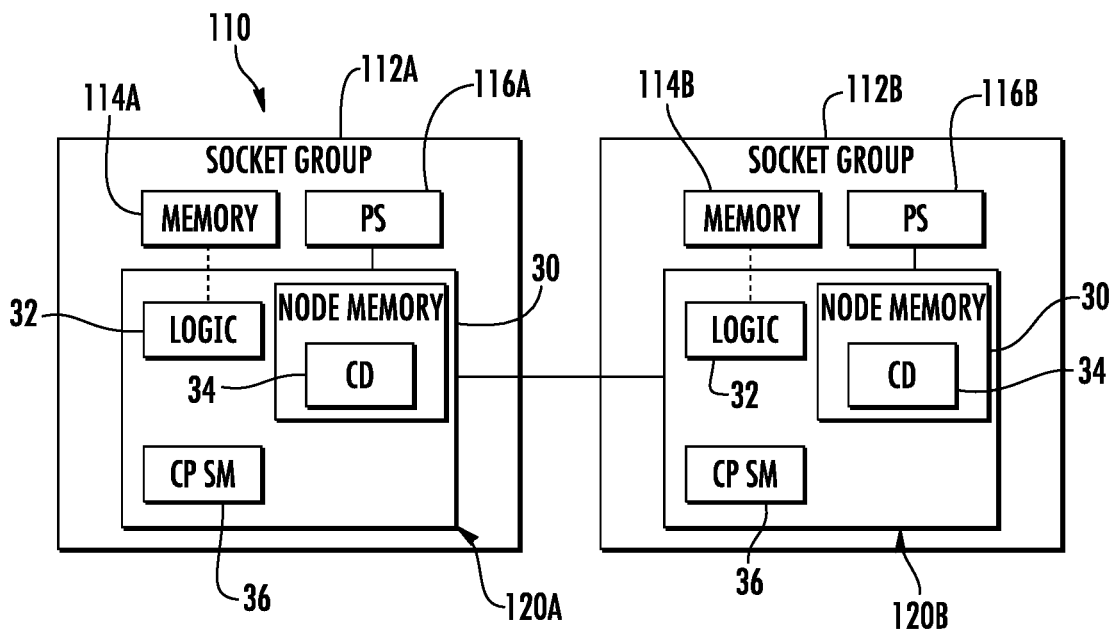
FIG. 2 is a schematic diagram illustrating portions of an example multiprocessor system.

FIG. 2 schematically illustrates portions of an example ccNUMA system 110. System 110 comprises socket groups 112A and 112B (collectively referred to as socket groups 112). Socket groups 112 are similar to one another. Each of socket groups 112 is similar to socket group 12B described above. Socket group 112A comprise at least one memory 114A, at least one processor having at least one processor socket 116A and at least one node controller 120A. Socket group 112B comprise at least one memory 114B, at least one processor having at least one processor socket 116B and at least one node controller 120B. As shown by FIG. 2, node controllers 120A and 120B are directly connected to one another via communication line 138. Each of memories 114A, 114B, and node controllers 120A, 120B are similar to memory 14 and node controller 20, respectively, described above.

Figure 3:
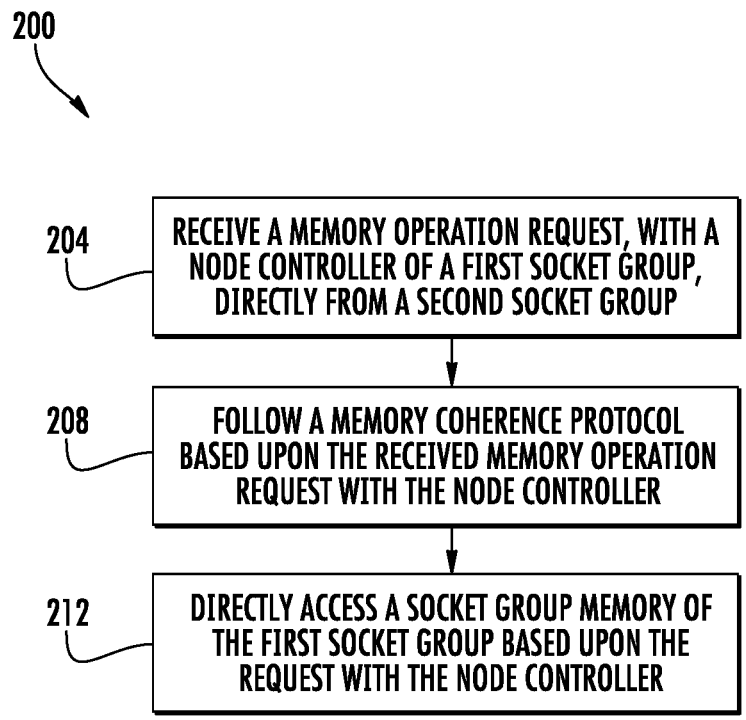
FIG. 3 is a flow diagram of an example method for reducing remote memory latency by avoiding delays through a processor socket.

FIG. 3 is a flow diagram of an example method 200 for reducing remote memory latency by avoiding delays through a processor socket. Method 200 facilitates direct node controller-to-node controller communication and direct node controller to socket group memory access, avoiding latency delays through a processor socket. Although method 200 is described as being carried out by multiprocessor system 110 described above, it should be appreciated that method 200 may likewise be carried out with other similar multiprocessor systems.

As indicated by block 204, logic 32 of node controller 120A of socket group 112A causes node controller 120A to receive a memory operation request directly from socket group 112B, without passing through processor socket 116A. For example, in one implementation, node controller 120A may receive a memory operation request directly from node controller 120B of socket group 112B. The memory operation request may be transmitted across communication line 138. The memory operation request may be in the form of a write request and/or a read request.

As indicated by block 208, logic 32 of node controller 120A causes node controller 120A to follow a memory coherence protocol based upon the received memory operation request. In one implementation, node controller 120A consults coherence directory 34 and applies coherence protocol state machine 36 based upon the current coherence status for the memory block set forth in the memory operation request. For example, node controller 120A may apply a first memory coherence protocol or set of rules in response to the memory operation request requesting a certain type of access to a memory block and may apply second memory coherence protocol or set of rules in response to the memory operation request requesting a second different type of access to the memory block. Node controller 120A may apply a first memory coherence protocol or set of rules in response to the memory operation request requesting a type of access to a first memory block and may apply a second memory coherence protocol or set of rules in response to the memory operation request requesting the same type of ask to a second memory block, different than the first memory block.

As indicated by block 212, logic 32 causes node controller 120A to directly access a socket group memory, such as memory 114A based upon the memory operation request. Because node controller 120A directly accesses the socket group memory 114A without using processor socket 116A, latency is reduced. As should be appreciated, method 200 may likewise be carried out in a reverse manner such as where node controller 120B receives a memory operation request directly from socket group 112A, such as directly from node controller 120A.

Figure 4:
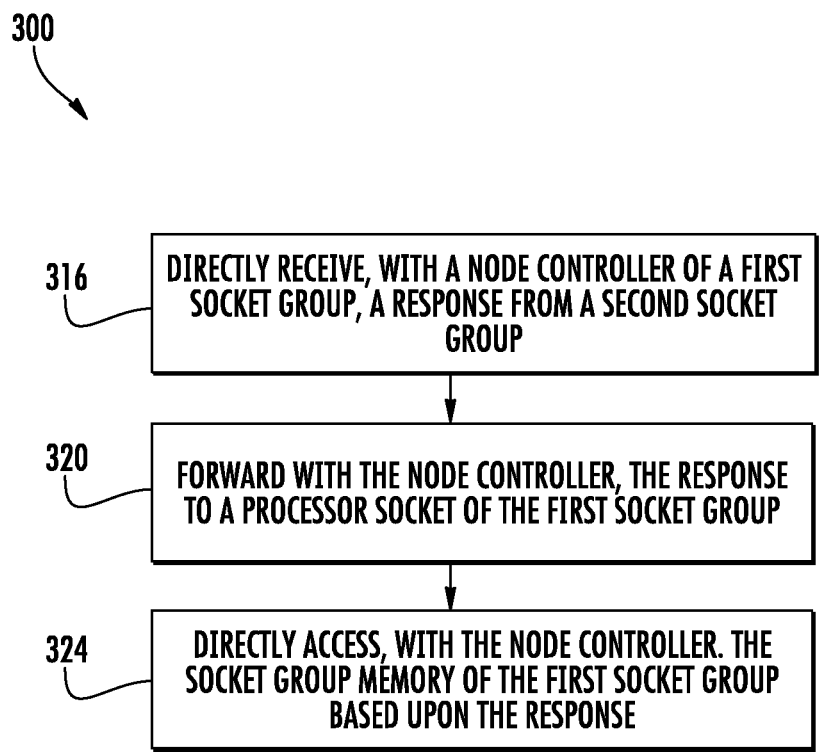
FIG. 4 is a flow diagram of an example method for reducing remote memory latency by avoiding delays through processor socket.

FIG. 4 is a flow diagram of an example method 300 for reducing remote memory latency by avoiding delays through a processor socket. As with method 200, method 300 facilitates direct node controller-to-node controller communication and direct node controller to socket group memory access, avoiding latency delays through a processor socket. Although method 300 is described as being carried out by multiprocessor system 110 described above, it should be appreciated that method 300 may likewise be carried out with other similar multiprocessor systems.

Method 300 aligned one example operation of a node controller when receiving a response directly from a controller of another socket group. Method 300 describes the actions of node controller 120B following a memory operation request made to node controller 120A of socket group 112A. As indicated by block 316, node controller 120B receives a response from socket group 112A. In one implementation, node controller 120B receives a direct response from node controller 120A.

As indicated by block 320, node controller 120B may forward the response to processor socket 116B. As indicated by block 324, node controller 120B may directly access the socket group memory 114B based upon the response. In one implementation, node controller 120B may concurrently carry out block 320 and 324 to reduce latency. In other implementations, node controller 120B may carry out blocks 320 and 324 in the order illustrated or in a reverse order.

Figure 5:
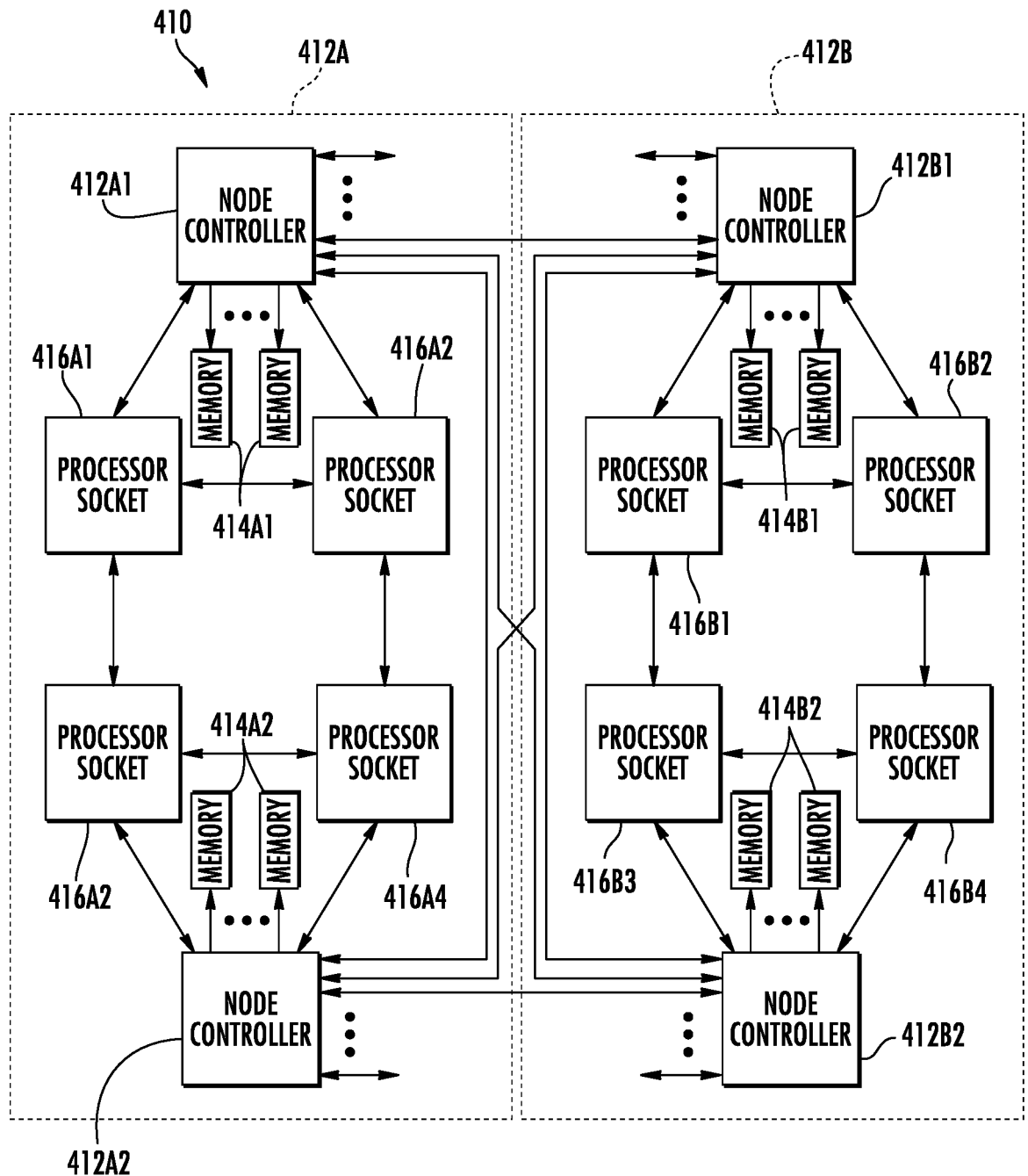
FIG. 5 is a schematic diagram illustrating portions of an example multiprocessor system.

FIG. 5 is a schematic diagram of an example multiprocessor, ccNUMA system 410. System 410 comprises socket groups 412A and 412B (collectively referred to as socket groups 412). Socket groups 412 are similar to one another. Socket group 412A comprises memories 414A1, 414A2, at least one processor having processor sockets 416A1, 416A2, 416A3, 416A4, and node controllers 420A1, 420A2. Each of processor sockets 416A1 and 416A2 are directly connected to one another. Node controller 412A1 is directly connected to memories 414A1 while node controller 412A2 is directly connected to each of memories 414A2.

Similarly, socket group 412B comprises memories 414B1, 414B2 (similar to memory 14 described above), at least one processor having processor sockets 416B1, 416B2, 416B3, 416B4, and node controllers 420B1, 420B2. Each of processor sockets 416B1 and 416B2 are directly connected to one another. Node controller 412B1 is directly connected to memories 414B1 while node controller 412B2 is directly connected to each of memories 414B2. As further shown by FIG. 5, each of the node controllers 412A1, 412A2, 412B1 and 412B2 (collectively referred to as node controllers 412) are directly connected to one another.

Each of node controllers 412 are similar to one another. Each of node controllers 412 is similar to node controller 20 described above. Each of node controllers 412 comprises node memory 30 storing a coherence directory 34. Each of node controllers 412 further comprises logic 32 and coherence protocol state machine 36 described above.

Figure 6:
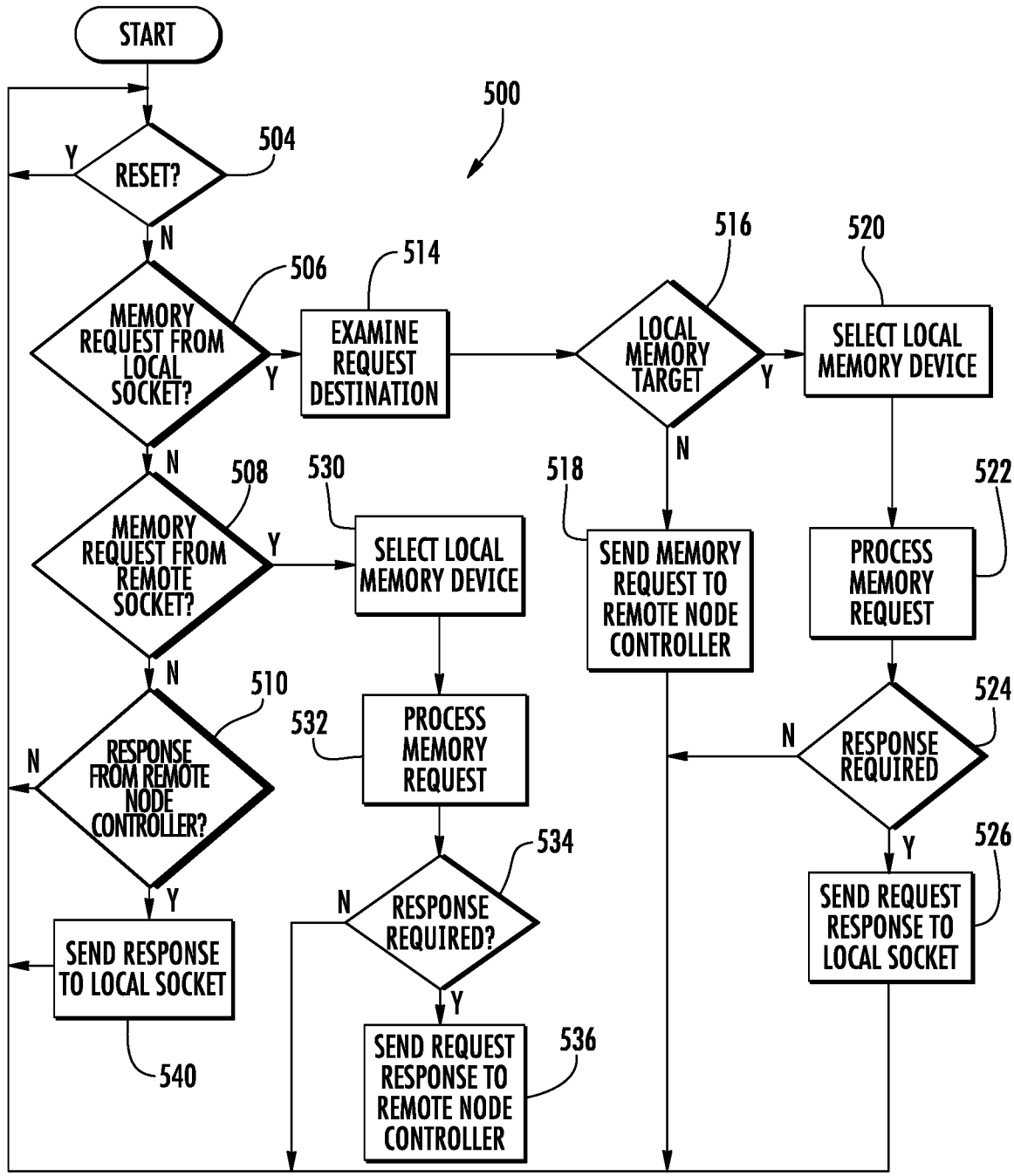
FIG. 6 is a flow diagram of an example method for a node controller to reduce remote memory latency by avoiding delays through a processor socket.

FIG. 6 is a flow diagram of an example method 500 that may be carried out by each of the individual node controllers 412 of system 410. For purposes of discussion, method 500 is described as being carried out by node controller 412A1. As indicated by decision block 504, upon determining that the node controller is not in a reset mode, logic 32 of node controller 412A1 proceeds through decision blocks 506, 508 and 510 to determine or categorize a memory operation request that is been received. As indicated by block 506, upon determining that the memory operation request is from a local socket, a processor socket in the same socket group (socket group 412A), logic 32 causes node controller 412A1 to examine the memory destination of the request per block 514.

As indicated by decision block 516, logic 32 determines whether the destination of the request is a local destination. As indicated by block 518, in response to determining that the destination of the memory request is not local, the destination being that of a memory in a different socket group, such as socket group 412B, logic 32 causes node controller 412A1 to send the memory request directly to the remote node controller that is directly connected to the destination. For example, logic 32 may cause node controller 412 to directly transmit a memory request to a selected one of node controllers 420B1 or 420B2 of socket group 412B.

As indicated by blocks 520 and 522, in response to determining that the memory request received from the local socket is for accessing a local memory address, such as an address contained in a memory 414A1 or in a memory 414A2, logic 32 causes node controller 412A1 to select the local memory and process the memory request. As indicated by decision block 524, once the memory request has been processed, logic 32 cause node controller 412A1 to determine whether a response is required. As indicated by block 526, in response to determining that a response is required, logic 32 cause node controller 412A1 to send the request response to the local socket, one of socket 416A1, 416A2. In one example, node controller 412A1 tracks the memory requests by both local and remote and updates the coherence directory with ownership, state and other information.

As indicated by block 508, logic 32 cause node controller 412A1 to determine whether the memory operation request is from a remote socket, whether the memory operation request is from one of the processor sockets 416B1, 416B2 of processor socket 412B. As indicated by blocks 530 and 532, in response to determining that the memory request received from the remote socket, logic 32 causes node controller 412A1 to select the local memory and process the memory request.

FIG. 7 is a flow diagram illustrating one example method 600 that may be carried out by a node controller, such as transmitting the request packet to the attached memory 414A1 by the above node controller 412A1 when processing a memory request as set forth in block 522 or block 532. As indicated by decision block 604, logic 32 cause node controller 412A1 to determine whether there is transmit (Xmit) Flow control credit is available. The flow control credit is used to communicate the readiness of the receiving device, in this case memory 414A1, to accept information from the transmitting device, in this case node controller 412A1. If no transmit credit is available, the transmitting device, in this case node controller 412A1, must wait before transmitting the request. As indicated by blocks 606, 608 and 610, if such transmit (Xmit) flow control credit is available, logic 32 cause node controller 412A1 to calculate the target device address, to assemble the request packet and to transmit the request packet to the memory device. For example, the request packet may be transmitted from node controller 412A1 to one of memories 414A1.

As indicated by decision block 612, logic 32 further causes the node controller, in this example node controller 412A1, to determine if the type of request received from the remote socket is one that expects a response. As indicated by decision block 614, logic 32 causes the node controller 412A1 to wait until a response is received from the memory device. As indicated by block 616 and 618, once the response has been received from the memory device, logic 32 causes node controller 412A1 to capture and held the response and send a transmit (xmit) flow control credit to the memory device allowing the transmitting device, in this case memory 414A1, to transmit additional responses. This response is held until it can be sent to the requesting processor directly or through other node controllers.

Referring back to FIG. 6 in method 500, once the memory request has been processed, logic 32 cause node controller 412A1 to determine whether a response is required for decision block 534. As indicated by block 536, in response to determining that a response is required, logic 32 cause node controller 412A1 to send the request response to the remote node controller, one of node controllers 412B1, 412B2.

As indicated by block 540, upon determining that the memory operation request is not a memory request from a local socket (per block 506), is not a memory request from a remote socket (per block 508) and is a response from a remote node controller (per block 510), logic 32 causes node controller 412A1 to conclude that the memory operation is a response to a local socket. In other words, the response is to a local processor socket 416A1 or 416A2. As a result, logic 32 causes node controller 412A1 to send the response to the local processor socket from which a previous request to a remote memory was made.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noded, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A node controller for a first processor socket group, the node controller comprising:
   a node memory storing a coherence directory; and
   logic causing the node controller to:
      receive a memory operation request directly from a second processor socket group;
      follow a coherence protocol based on the memory operation request and the coherence directory;
      directly receive a response from the second processor socket group;
      forward the response to a processor socket of the first processor socket group; and
      directly access a socket group memory of the first processor socket group based upon the response and on the request, wherein the forwarding of the response to the processor socket of the first processor socket group is concurrent with the accessing of the socket group memory of the first processor socket group based upon the response.

2. The node controller of claim 1, wherein the logic is to further cause the node controller to:
   forward a coherency change to a processor socket of the first socket group based upon the memory operation request; and
   update the coherency directory with the coherency change.

3. The node controller of claim 1, wherein the logic is to further cause a node controller to:
   receive a second memory operation request, with the node controller of the first socket group, from a processor socket of the first socket group;
   determine, with the node controller, a coherency status for the second memory operation request from a coherency directory located on the node controller of the first socket group; and
   access the socket group memory of the first socket group based upon the second memory operation request and the determined coherency status for the second memory operation request.

4. A method comprising:
   receiving a memory operation request, with a node controller of a first socket group, directly from a second socket group;
   following a coherence protocol based upon the received memory operation request with the node controller;
   directly receiving, with the node controller, a response from the second socket group;
   forwarding, with the node controller, the response to a processor socket of the first socket group;
   directly accessing a socket group memory of the first socket group based upon the request with the node controller and the response, wherein the forwarding of the response to the processor socket of the first socket group is concurrent with the accessing of the socket group memory of the first socket group based upon the response.

5. The method of claim 4 further comprising
   forwarding, with the node controller, a coherency change to a process socket of the first socket group based upon the memory operation request; and
   updating a coherency directory on the node controller with the coherency change.

6. The method of claim 4 further comprising:
   receiving a second memory operation request, with the node controller of the first socket group, from a processor socket of the first socket group;
   determining, with the node controller, a coherency status for the second memory operation request from a coherency directory located on the node controller the first socket group; and
   accessing the socket group memory of the first socket group based upon the second memory operation request and the determined coherency status for the second memory operation request.

7. A system comprising:
   a first processor socket group comprising:
      first processor socket;
      a first socket group memory; and
      a first node controller; and
   a second processor socket group comprising:
      a second processor socket;
      a second socket group memory; and
      a second node controller, the second node controller comprising logic causing the second node controller to:
         receive a memory operation request directly from the first node controller;
         follow a coherence protocol based upon the received memory operation request;
         directly receive a response from the first processor socket group;
         forward the response to the second processor socket; and
         directly access the second socket group memory based upon the request and the response, wherein the forwarding of the response to the processor socket of the second processor socket group is concurrent with the accessing of the socket group memory of the second processor socket group based upon the response.

8. The system of claim 7, wherein the first node controller further comprises a coherence directory.

9. The system of claim 7, wherein the second processor socket group further comprises:
   a third processor socket directly connected to the second processor socket;
   a third node controller directly connected to the third processor socket and directly connected to the second node controller;
   a third socket group memory directly connected to the third node controller.

10. The system of claim 9, wherein the third node controller comprises logic causing the third node controller to:
    receive a second memory operation request directly from the third node controller;
    follow a coherence protocol based upon the second received memory operation request; and
    directly access the third socket group memory based upon the request.

11. The system of claim 9, wherein the third node controller comprises logic causing the third node controller to:
    receive a second memory operation request from the second node controller;
    determine, with the third node controller, a coherency status for the second memory operation request from a coherency directory located on the third node controller; and
    access the third socket group memory based upon the second memory operation request and the determined coherency status for the second memory operation request.

* * * * *